Feb. 21, 1961 K. M. ROTH ET AL 2,972,167
FOWL DEFEATHERING APPARATUS
Filed Oct. 22, 1956 2 Sheets-Sheet 1
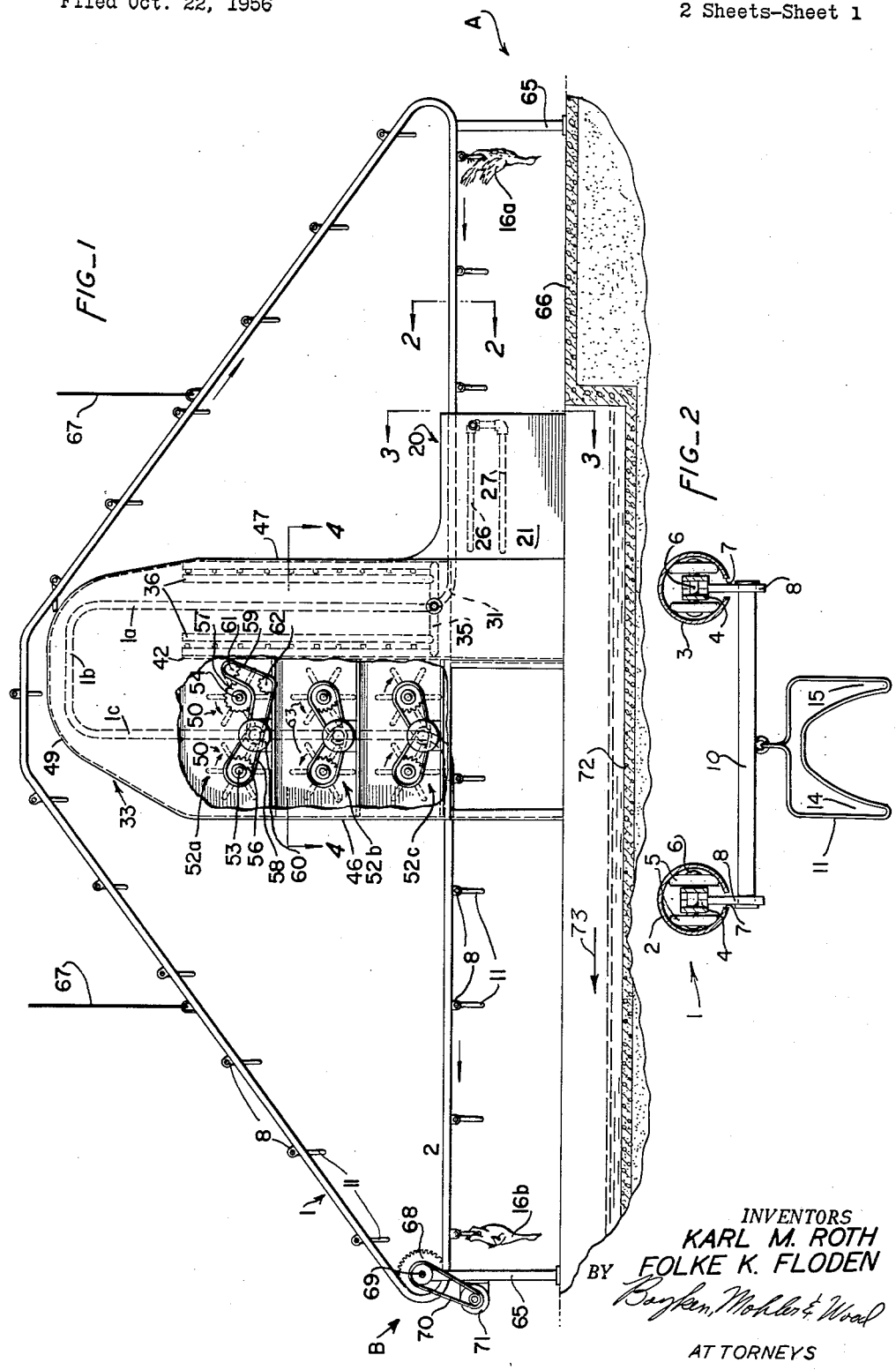
INVENTORS
KARL M. ROTH
FOLKE K. FLODEN
BY
ATTORNEYS

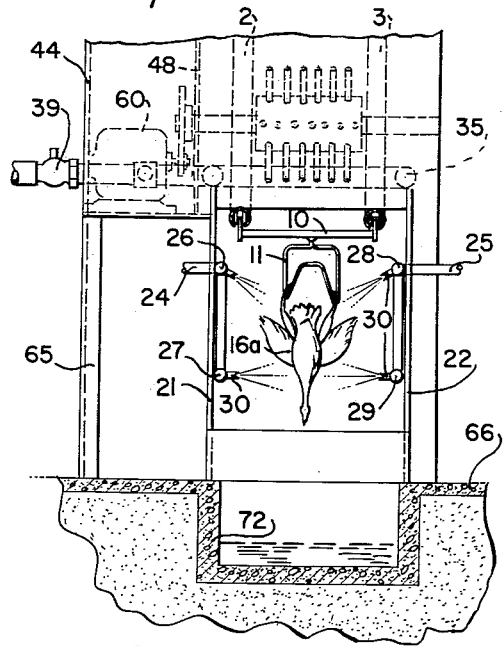
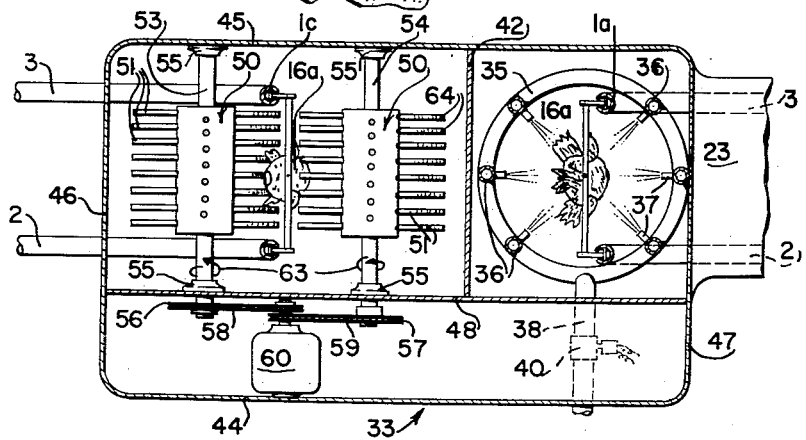

2,972,167
FOWL DEFEATHERING APPARATUS

Karl M. Roth, P.O. Box 714, and Folke K. Floden, 1518 "I" St., both of Modesto, Calif.

Filed Oct. 22, 1956, Ser. No. 617,452

7 Claims. (Cl. 17—11.1)

This invention relates to poultry or fowl defeathering apparatus and more particularly to a new and novel apparatus for automatically scalding and picking the feathers from fowls.

Heretofore many devices have been proposed to defeather fowls. Such previous devices have usually provided a hot water tank or trough through which the fowl was dragged to scald or loosen the feathers. Thereafter the bird was subjected to various beating devices to remove the loosened feathers.

The obvious difficulty with the tank or trough device was that over any appreciable period of time the water therein became fouled with feathers and like debris and in spite of attempts to clean the water a very unsanitary condition resulted. Likewise, wet feathers readily adhered to the beating devices and associated parts of the machine and frequent cleaning of such prior apparatus was found necessary to its operation.

Since this prior apparatus usually had to be shut down to be adequately cleaned it could not be continuous in operation and therefore suffered substantial loss of efficiency. Such apparatus also commonly required a substantial amount of floor space for extended conveyors and the like and was therefore adaptable for use only in larger installations.

It is therefore a main object of this invention to provide a fowl defeathering apparatus which overcomes the disadvantages of prior art apparatus.

It is another object of this invention to provide a novel and efficient method for defeathering fowl.

Still another object of this invention is the provision of a method for defeathering fowl in the practice of which sanitary conditions may be easily maintained.

It is a further object of this invention to provide a fowl defeathering device that is compact in design and which requires a minimum of floor space for installation and operation.

It is another object of this invention to provide a fowl defeathering device that permits a large volume of birds to be processed in a unit time by continuously moving the fowls past various stations of the device where successive operations are performed.

It is further an important object of this invention to provide a fowl defeathering device that is essentially self cleaning in operation, thereby obviating the need for frequent shut-downs of the machine for cleaning purposes.

It is yet another object of this invention to provide a fowl defeathering device that is inexpensive to make, economical to operate, and simple in design thus making itself readily acceptable to the poultry processing and packaging industry.

Furthermore, it is another object of this invention to provide a wetting and scalding device for loosening the feathers from the fowl that is incorporated in the defeathering apparatus and performs a necessary function for the self cleaning of the machine as before stated.

Other objects and advantages will become evident from the detailed specification and accompanying drawings in which:

Fig. 1 is a side elevational view of the device of this invention, partly broken away to show structure;

Fig. 2 is an enlarged sectional view, taken along line 2—2 of Fig. 1, of the fowl carrying conveyor;

Fig. 3 is an enlarged sectional view taken substantially along line 3—3 of Fig. 1 showing the fowl wetting apparatus; and, Fig. 4 is an enlarged transverse sectional view, taken along line 4—4 of Fig. 1, showing the scalding and plucking apparatus.

Briefly, the method of this invention includes conveying the fowl along a path of travel and performing various steps along such path. The bird is carried to a spray booth where it is thoroughly wetted by a hot water solution, then moved along through a steaming booth where it is impinged by steam at a substantially elevated temperature and then into the plucking apparatus from which it emerges completely defeathered.

The plucking apparatus is enclosed and connected with the steaming booth so that a major portion of the steam is carried through the plucking apparatus for condensing and washing down said apparatus. A sump is provided extending below the spray booth, steaming booth and plucking apparatus to receive the water draining from the bird in the spray booth and carry with it the steam condensate and picked feathers draining from the plucking apparatus.

In detail, as best seen in Figs. 1, 2, the conveyor of this invention, generally designated 1, comprises a pair of parallel, spaced, longitudinally slitted, hollow tubing members 2, 3 which are adapted to provide the track for the conveyor chain. An endless chain 4, such as a roller chain, is contained within the tubing members 2, 3 and at spaced intervals the chain is movably supported by means of a pair of spherically contoured rollers 5 rotatably mounted one on either side of chain 4 to a transverse axle or pin 6 which is mounted centrally through a link of the chain.

As before stated, the tubing members 2, 3 are slitted longitudinally for their entire length, as at 7, for the purpose of receiving therethrough a plurality of short, outwardly directed struts 8, each of which is rigidly connected at one of its ends to the chain 4, preferably near or on the link that also has the support rollers 5 attached thereto.

The chains 4 within each tubular track 2, 3 are each adapted to be fitted with a plurality of struts 8 at some predetermined spaced interval, and furthermore, the chains 4 are positioned within each tube so that the struts 8 depending from each are in transverse alignment.

Rotatably mounted to and extending between each pair of opposed struts 8 transverse to path of travel, is an elongated flight or hanger bar 10. The hanger bars 10 are freely rotatable about their longitudinal axis so that the fowl carrying hook 11 swingably attached to the central portion of each flight 10 is always depending in a vertically downward direction regardless of the direction that the struts 8 are directed.

The actual defeathering of the fowl will now be described with reference to the accompanying drawings.

With reference to Fig. 2, the fowl carrying hook 11 is shown. The lower portion of the legs of a bird are each inserted into the downwardly converging spaces 14, 15 of the hook 11 so that the narrow portion of the inserted leg is wedged between the converging portions of the hook. The enlargements of the leg such as the ankle and knee joints retain the fowl within the grasp of the hook until such time as the bird is freed from the hook by lifting the legs upwardly and out of the converging spaces 14, 15.

Letter A (Fig. 1) refers to the starting position of a defeathering cycle where each fowl that is to be defeathered is put on a hook 11 as described. The feathered fowl 16a, suspended head down, is then advanced forwardly along the conveyor, as indicated by the arrow, to enter into the wetting chamber 20 where it is impinged by a stream of liquid, at an elevated temperature, to thoroughly wet the bird. In actual practice water has been found to be an effective wetting medium.

Chamber 20 comprises a pair of vertical opposed side members 21, 22 (Figs. 1, 3) with a sufficiently large opening formed between them to permit entry of the suspended fowl on conveyor 1. A top member 23 over the conveyor 1 may be provided if desired (Fig. 4).

The wetting medium, hereinafter referred to as water, is carried to the fowl by means of a pair of entry pipes 24, 25 mounted through side members 21, 22 respectively, and each is joined to a pair of interconnected, parallel, longitudinally extending spray pipes 26, 27 and 28, 29, respectively (Figs. 1, 3). Pipes 26, 27 are mounted adjacent the inner surface of plate member 21, and the spray pipes 28, 29 are mounted opposed from and parallel with pipes 26, 27 on the inner surface of plate member 22.

Hot water is adapted to enter through pipes 24, 25 from a heating source (not shown), and to then flow through the spray pipes 26, 27, 28 and 29 to be impinged upon the bird 16a by means of nozzle elements 30 mounted at spaced intervals along the said spray pipes 26, 27, 28, 29. The water may then be permitted to drain off the bird.

The water spray performs several functions; it cleans the bird, it dissolves the oily coating on the feathers that protects the bird, when alive, from dampness, and it starts to loosen the feathers. One of the reasons of suspending the bird upside-down is that it facilitates the wetting action as the water is more readily absorbed into the plumage of the bird. If the water impinged the bird from above its head it would tend to run off or be shed more easily due to the lay of the feathers.

After passing through the hot water spray chamber, the tubular track members 2, 3 of conveyor 1 are bent or deflected, as at 31 (Fig. 1), to a vertically upwardly extending direction to provide a vertical run 1a of conveyor 1. Said vertical run of the conveyor 1 is enclosed in a generally rectangular cross section, vertically elongated, open bottom housing 33 that is adapted to contain therein the scalding and picking mechanisms.

At the lower end of vertical run 1a of the conveyor 1 the tubular guide rails 2, 3 are adapted to extend through an encircling, horizontally disposed steam distributing header 35 (Fig. 4). Tubes 2, 3 are so positioned that the transverse flight or hanger bar 10 lies along a diameter of the circular header 35. Extending upwardly at spaced intervals around the circumference of header 35 are a plurality of upstanding, elongated pipes or conduits 36 communicating with the header at their lower ends.

Projecting radially inwardly to the center of the circular space defined by the plurality of pipes 36 are a plurality of steam nozzles 37 arranged at spaced intervals along each of the pipes 36.

Nozzles 37 are adapted to direct an impinging jet of steam upon the fowl as the latter is being carried vertically upward by the conveyor. Hot steam from a steam generating source (not shown) is introduced to header through the inlet pipe 38 which communicates with the header 35. A pressure control valve 39 (Fig. 3) may be interposed in the steam line 38 between the steam generator and the header 35, and so may a thermostatic control mechanism 40 (Fig. 4) which is adapted to maintain the entering steam between an upper and lower temperature limit. It has been found in actual practice that steam of about 300° F. satisfactorily scalds the birds to loosen their feathers without cooking them. Of course, the speed of the conveyor is also a determining factor upon the temperature of the steam. It is also obvious that scalding media other than steam may be used.

It is seen in Fig. 4 that the scalding mechanism is partitioned from the picking mechanism by a vertical wall 42 that extends to substantially the same elevation as the upper ends of the pipes 36 (Fig. 1). At a point spaced above the upper terminal ends of pipes 36 the conveyor portion 1a is deflected to a short horizontal connecting run 1b and is then again bent or deflected at substantially right angles to extend downwardly in a second vertical run 1c, thus changing the path of travel of the flights 10 from an upwardly direction, as along 1a, to a vertically downward path along portion 1c.

The short horizontal run 1b, still within the housing 33, is positioned far enough above the upper edge of partition 42 to allow the fowls suspended from the hooks 11 to pass over said partition without becoming entangled with the same.

As seen in Fig. 4, the housing, generally designated 33, comprises a pair of vertically extending, parallel side walls 44, 45 integrally connected at their forward and rear ends to a pair of parallel, transverse end walls 46, 47. A second, internal, vertical wall 48, parallel to wall 44 and spaced therefrom is adapted to be connected at its ends to the pair of end walls 46, 47. Walls 48 and 45 actually define the width of the defeathering chamber as the outer wall 44 merely serves as an outside cover over the various drive mechanisms for the picking devices which will be later described. Housing 33 is also provided with a top cover 49 and encloses runs 1a, 1b and 1c of the conveyor. Said housing is open at its bottom end, at least at end walls 46, 47 for entry of conveyor 1 thereinto.

The picking apparatus of this invention consists of a plurality of vertically aligned, horizontally disposed, pairs of rotatable drums 50 to which are fitted a plurality of radially outwardly extending, flexible fingers 51 (Fig. 4). In this embodiment of the invention there are three picking units 52a, 52b, 52c vertically spaced apart along conveyor run 1c and similar in design and operation, differing only in the direction of rotation of the drums 50.

The construction of the upper picking unit 52a will be described in detail as it is typical of the middle and lower units 52b, 52c, respectively. Picking unit 52a consists of a pair of rotatable drums 50 mounted on either side of the downwardly directed run 1c of the conveyor 1 and extending transversely on either side thereof.

Drums 50 are mounted, for rotation therewith, to a pair of parallel shafts 53, 54, respectively. Shafts 53, 54 are rotatably journalled in bearing blocks 55 (Fig. 4) mounted to the inner surfaces of walls 45, 48 of the enclosing housing 33. The ends of shafts 53, 54 near wall 48 are adapted to pass therethrough and be each fitted with a chain sprocket wheel 56, 57, respectively (Fig. 1). Sprocket wheels 56, 57 are engaged and driven by a pair of roller chains 58, 59 respectively that in turn are driven by a motor means such as indicated at 60.

As the bird 16a first enters the picking chamber and is met by the upper picking unit 52a, it has been found desirable to rotate the drums 50 of the unit 52a in such a manner that the bird 16a is drawn in between them. This is done by rotating drums 50 in opposite directions such that the ends of fingers 51 of each drum at the point of their tangential engagement adjacent conveyor run 1c are moving in a downward direction. This necessitates rotating the left hand drum 50 in a clockwise direction as viewed in Fig. 1 and the right hand drum 50 in a counter-clockwise direction.

This is accomplished by means of a pair of idler sprockets 61, 62 that permit the chain 59 to engage the sprocket 57 along the outer side of said chain to thereby turn sprocket 57 in a contrary direction to the direction of sprocket 56. Owing to the irregularities in the shapes and sizes of different birds and due to the fact that the plumage usually covers the entire body of a bird, it is necessary that the flexible fingers 51 contact the bird at all points and in several directions. By passing through the three picking units, each of which is rotating in a different direction, the bird is uniformly flailed by the fingers 51 and all of the plumage is removed. It is understood, of course, that the bird 16a is moving at a steady slow rate through the picking units 52a, 52b, 52c, and that the drums 50 and fingers 51 of the units are rotating at a relatively rapid rate.

After having passed through the first picking unit 52a, the bird 16a is partially defeathered and immediately enters into the next or middle picking unit 52b, the components of which are in similar relationship as the components of 52a.

The drums 50 and attached fingers 51 that comprise the second picking unit 52b are adapted to both rotate in the same direction, counterclockwise as viewed in Fig. 1 and indicated by arrow 63. The drive mechanism of picking unit 52b is similar to that described for unit 52a except that the idler sprockets 61, 62 need not be utilized as there is no need to reverse the direction of rotation of one drum with respect to the other.

As seen in Fig. 4, the sides of the fingers 51 that engage and flail the bird 16a may be roughened as indicated at 64 to more effectively frictionally grip and remove the feathers. Fig. 4 shows the fowl 16a partially defeathered going through the second picking unit 52b. It is seen that the drum on the left is flailing the bird in an upward direction while the drum on the right is flailing the bird in a downward direction.

As illustrated, each picking unit 52a, 52b, 52c is driven by its own motor source 60. This is not essential as all may be driven from one motor, if desired. However, this latter arrangement would somewhat complicate the system of driving chains or belts.

The third picking unit 52c mounted below unit 52b is similar to the latter in all respects except for direction of rotation. The rotation of unit 52c is reversed from unit 52b so as to flail the bird 16a in the opposite direction from that which it just has been flailed. Unit 52c is utilized more by way of insurance than by way of necessity as the bird 16a is generally picked clean by the time it has passed beyond the second picking unit 52b.

After passing beyond the last picking unit 52c, the conveyor 1 is again deflected to a horizontal run where it emerges from the housing 33 and transports the now defeathered bird 16b to the unloading station B at the left side of Fig. 1.

The conveyor may be supported by legs 65 which at their lower end are supported by the concrete of the floor 66. Also the elevated return run of the conveyor may be supported by means of hanger straps 67 which are fastened at their upper ends to the overhead framework of the building in which the present invention may be housed (not shown).

The link chains 4 within the tubular members 2, 3 may be driven by means of a pair of sprocket wheels 68 communicating with the chain 4 through a slot in the surface of the tubular member diametrically opposite from the slit 7. The drive mechanism may be located in any convenient location. However, it is preferable to place sprocket wheels 68 at a radial bend in the tubular member 2, 3 so that more of the outer periphery of sprocket wheels 68 will be in engagement with the chains 4 at one time. Sprockets 68, mounted coaxially on a transverse drive shaft 69 so that the chains 4 within each tubular member 2, 3 are being simultaneously driven, may be rotated by means such as belt or chain 70 which connects to a reduced speed source such as a motor and speed reducer combination 71.

As stated in the objects of this invention, this device is adapted to be essentially self cleaning. This is accomplished by means of convection currents which carry the steam that comes from the scalding unit upward to the roof 49 of the housing 33 where some of it condenses. The rest is conducted downward through the picking elements 52a, 52b, 52c where it condenses in transit and settles as a hot mist upon the walls and picking units. As the feathers of the bird are removed, they are thrown by centrifugal force outwardly away from the fingers 51 to be either directed downwardly through the opening of the housing at the bottom or else to be thrown upon the walls of the housing and then to be carried away therefrom by means of the condensed steam that is continuously washing down the walls of the housing.

All feathers and condensed water are drained into an underlying sump or trough 72, as is the water from chamber 20, which trough extends longitudinally with the conveyor 1 from the point of initial wetting to the unloading station B. In this manner water from wetting chamber 20 is continually flowing in the direction of arrow 73 (Fig. 1) and will carry with it the steam condensate and removed feathers washed down from the steam spray booth and picking chamber. If desired, the feathers may be salvaged and the water can be collected and recirculated in the system.

It will be apparent that in its simplest form the method of this invention comprises moving the fowl along an enclosed path of travel, spraying it with a scalding medium, and removing the feathers. The enclosure of the path of travel permits the use of the scalding medium as a washing medium in the feather removal step. As a refinement of the method, the addition of an initial wetting step provides a stream of water draining from the bird, to which stream the scalding medium condensate and removed feathers will fall and be carried away. If the path of travel of the fowl is arranged vertically through the scalding and feather removing steps, it is obvious that the removed feathers and condensate will fall more readily therefrom and more efficiently clean any apparatus involved.

It is evident from this detailed description of the invention that a large number of fowls may be defeathered in a relatively short period of time, and furthermore that the operation is completely automatic from the time the bird is loaded at station A until it is taken off from the hook 11 at station B.

A brief word regarding the return run of the conveyor is in order to more fully explain why the return run was accomplished at an elevated position rather than bending around in the same horizontal plane as the working run.

In order to maintain proper spacing of the flights 10 it is essential that the opposed struts 8 of the parallel chains move always in a substantially parallel, equally spaced relation. This means that each chain must travel the same linear distance in the same time and therefore requires all radii in the conveyor 1 of the members 2, 3 to be equal at every point. If this were not adhered to, expensive speed differentiating equipment would have to be utilized, inasmuch as it is a primary object of this invention to be economically feasible the conveying system was designed as it has been described.

It is obvious many modifications of this invention could be resorted to, such as open conveyor chains, more or less picking units 52, hooks capable of supporting several birds each, and many others that would not be outside the spirit and scope of this invention.

I claim:

1. Fowl defeathering apparatus comprising: an inverted U-shaped conveyor providing a pair of horizontally spaced, vertically extending runs and an upper connecting run, means for supporting a fowl on said conveyor for movement along said runs, spray means arranged along and directed toward one of said vertical runs for spraying steam on a fowl during movement therealong, a plurality of picking rotors arranged along the other of said vertical runs on opposite sides thereof for removing the feathers from a fowl during movement therebetween, and means enclosing said runs, said spray means and said picking rotors for conducting steam from said spray means to and past said picking rotors and outwardly of the open lower end of said enclosing means.

2. Fowl defeathering apparatus comprising: an inverted U-shaped conveyor providing a pair of horizontally spaced, vertically extending runs and an upper connecting run, means for supporting a fowl on said conveyor for movement along said runs, spray means arranged along and directed toward one of said vertical runs for spraying steam on a fowl during movement therealong, a plurality of picking rotors arranged along the other of said vertical runs on opposite sides thereof for removing the feathers from a fowl during movement therebetween, and conduit means conforming generally to the shape of said conveyor and enclosing the same for conducting steam in association with a fowl from said spray means to and past said picking rotors.

3. Fowl defeathering apparatus comprising: an inverted U-shaped conveyor providing a pair of horizontally spaced, vertically extending runs and an upper connecting run, means for supporting a fowl on said conveyor for movement along said runs, spray means arranged along and directed toward one of said vertical runs for spraying steam on a fowl during movement therealong, a plurality of picking rotors arranged along the other of said vertical runs on opposite sides thereof for removing the feathers from a fowl during movement therebetween, means adjacent an initial portion of said run for wetting a fowl on said conveyor prior to entry into said spray means.

4. Fowl treating apparatus comprising: a generally vertically extending conveyor for carrying a fowl along a generally vertical path of travel in one direction, housing means enclosing a portion of said conveyor and said path and having an inlet end and an opposed, open discharge end, a source of vaporized scalding medium, and spray means connected to said source and mounted adjacent said portion of said conveyor for spraying said vaporized scalding medium on a fowl in said portion of said path, said discharge end of said housing means opening outwardly downwardly for communication with the inlet of an enclosed mechanical picking apparatus for discharging a substantial portion of said scalding medium with such fowl into and through such picking apparatus.

5. Fowl defeathering apparatus comprising: conveyor means including connected first and second runs for carrying a fowl therealong, water spray means adjacent an initial portion of said first run for spraying water on a fowl carried by said conveyor, steam spray means adjacent said first run for spraying steam on a fowl carried by said conveyor along said first run, conduit means enclosing adjacent portions of said first and second runs and providing communication therebetween for conducting a substantial quantity of said steam with said fowl to said second run, mechanical picking means adjacent said second run for flailing the feathers from said fowl carried by said conveyor along said second run, said conduit opening outwardly downwardly at said second run for continuously draining said steam and feathers therefrom by gravity, and a trough extending under said conveyor from said water spray means to and past said second run for draining said water, condensed steam, and removed feathers away from said conveyor.

6. Fowl defeathering apparatus comprising: a housing including spraying and picking sections, a conveyor mounted for movement through said housing for carrying fowl therethrough, means associated with said spraying section for spraying steam on a fowl carried by said conveyor, mechanical picking means associated with said picking section and adjacent said conveyor for flailing the feathers from said fowl, said spraying and picking sections being in communication for conducting a substantial quantity of steam with said fowl to said picking section, said picking section having an opening in the lower portion thereof for continuously draining said steam and feathers therefrom by gravity.

7. Fowl treating apparatus comprising an enclosed housing having opposed inlet and discharge ends one of which is elevated above the other and including a spraying section, a conveyor mounted for movement through said housing and said spraying section for carrying a fowl therethrough, means associated with said spraying section for spraying steam on a fowl carried by said conveyor, the lower one of said ends opening outwardly downwardly for continuously draining steam condensate therefrom, and said discharge end being open for discharging a substantial portion of said steam with said fowl.

References Cited in the file of this patent

UNITED STATES PATENTS

| | | |
|---|---|---|
| 957,466 | Judge | May 10, 1910 |
| 2,328,770 | Barker | Sept. 7, 1943 |
| 2,389,404 | Barker | Nov. 20, 1945 |
| 2,549,070 | Drews | Apr. 17, 1951 |
| 2,596,443 | Sharp | May 13, 1952 |
| 2,603,831 | Sharp | July 22, 1952 |
| 2,649,615 | Sharp | Aug. 25, 1953 |
| 2,820,245 | Turner | Jan. 21, 1958 |
| 2,866,998 | Turner | Jan. 6, 1959 |